May 30, 1933.  R. D. HICKOK  1,911,362

METHOD AND APPARATUS FOR TESTING RADIO RECEIVING SETS

Filed July 11, 1929

INVENTOR
ROBERT D. HICKOK
BY
Brockett, Hyde, Higley & Meyer
ATTORNEYS

Patented May 30, 1933

1,911,362

UNITED STATES PATENT OFFICE

ROBERT D. HICKOK, OF CLEVELAND, OHIO, ASSIGNOR TO CLEVELAND PATENTS, INCORPORATED, OF CLEVELAND, OHIO, A CORPORATION OF OHIO

METHOD AND APPARATUS FOR TESTING RADIO RECEIVING SETS

Application filed July 11, 1929. Serial No. 377,451.

This invention relates to improved method and apparatus for producing a modulated radio frequency signal of definite or desider power value, for the purpose of applying the same to a radio receiver equipped for measuring its output, to thereby determine the over-all amplification of the receiver. The invention aims to supply in simple and portable form all the necessary apparatus for producing such evaluated modulated radio frequency signal, including the necessary adjustable device or devices for meeting any desired conditions within reasonable limits, all as will more fully appear hereinafter.

Further objects of the invention are in part obvious and in part will appear more in detail hereinafter.

Figure 1:
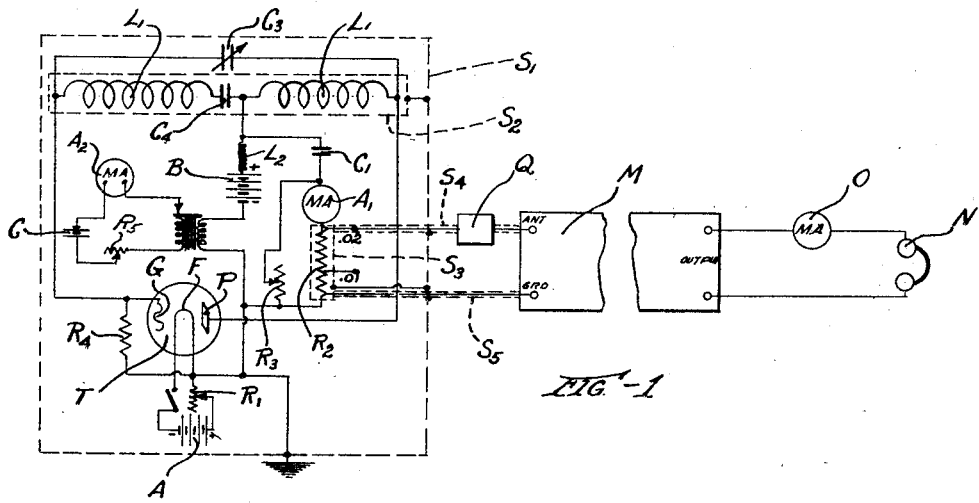
Figure 2:
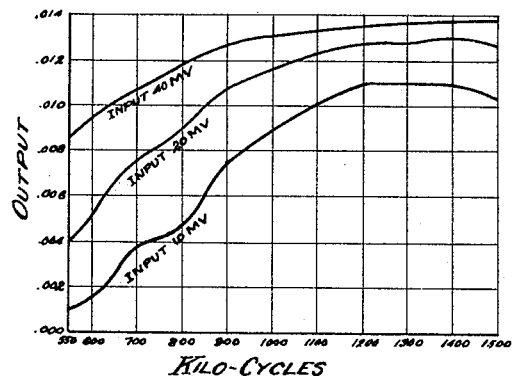
Figure 3:
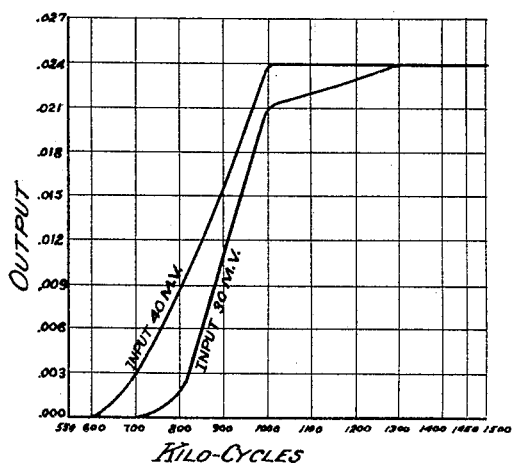

In the drawing, Fig. 1 illustrates diagrammatically one form of apparatus embodying the invention; and Figs. 2 and 3 are graphs illustrating the use of the invention.

Recognizing that the over-all amplification of any given radio receiving set can only be accurately determined when based upon a voltage input whose value is absolutely determined, the present apparatus is designed to enable the strength or voltage of the signal produced and supplied to the radio receiver to be so determined. Generally speaking, the system includes an oscillator or producer of radio frequency impulses or oscillations, the output portion of whose circuit includes an accurately calibrated resistance, adapted for connection to the input terminals of a radio receiver, together with means for establishing and maintaining in such resistance a known or desired voltage, and for applying the same to a radio receiver unaffected by radio frequency oscillations in other parts of the same or associated circuits. For convenience in the discussion of the invention, the apparatus will first be described.

It comprises, in the form shown, a suitable radio tube adapted to produce oscillations, such as the tube T provided with three elements, the filament F, grid G and plate P. The filament is heated by a suitable battery A with its positive side grounded, the circuit therefrom to the filament including a resistance $R^1$ which is either of fixed value or is adjustable to maintain proper filament voltage for lighting or heating purposes. The circuits to the tube also include a plate battery B of proper voltage for the purpose, a plate potential of 90 volts being usually suitable for the 199 type of tube commonly employed. Grid and plate are connected through an inductance $L^1$ shunted by a variable tuning condenser $C^3$, the inductance being divided at its mid point by a stopping condenser $C^4$, to the plate side of which is connected the positive lead of battery B through a radio frequency choke $L^2$. By choosing the proper amount of inductance $L^1$ and a suitable value of capacity $C^3$, which should be .00035 or less, the oscillator produces radio frequency current with a range of frequency covering any desired band, such as the broadcasting band.

In operation the radio frequency current must be filtered or separated from the direct current produced by the battery B in the plate circuit, which is accomplished by by-passing the radio frequency current around battery B by a condenser $C^1$ in a circuit having two branches, one including a suitable alternating current milliameter $A^1$, such as a milliameter of the thermocouple type, and an antenna resistance $R^2$, while the other leg includes a variable graduating resistance $R^3$. The negative side of the B battery is connected to ground. The fixed or antenna resistance $R^2$ is of definite value and usually provided with two taps, so that all or only half of it may be utilized, thereby increasing the effective range of the apparatus within the limits of a given milliameter $A^1$. The resistance of the antenna resistance $R^2$ is small, such as a total of .02 ohms for the upper tap and .01 ohms for the mid tap. Adjustment of the resistance $R^3$, which is adjustable either progressively or by very small increments, controls the amount of radio frequency current passing through the antenna resistance $R^2$, the limits of the value of resistance $R^3$ being such that practically all or none of the radio frequency current may be by-passed around meter $A^1$ and resistance $R^2$. The radio frequency choke $L^2$ further assists in insuring that all radio frequency current developed by the apparatus will pass through the two legs of the radio frequency circuit, to wit, that leg including milliameter $A^1$ and resistance $R^2$ and the other leg including resistance $R^3$. The direct current supplied by battery B flows from its positive connection through the radio frequency choke $L^2$, then through one half of inductance $L^1$, thence to the plate, thence through the vacuum space of the tube to the positive side of the filament. The radio frequency current, however, is generated by the tube and inductance $L^1$ and flows through inductance $L^1$ from its center tap to the plate, thence to the filament, thence through resistance $R^2$ and milliameter $A^1$ and condenser $C^1$.

A suitable connection is also provided from inductance $L^1$ to the grid, which preferably includes a resistance $R^4$ between the grid and ground, serving in the nature of a grid leak so that the grid will assume correct potential when the tube is in oscillation. The stopping condenser $C^4$ prevents the positive voltage of battery B from reaching the grid.

Means is also provided for producing an audio frequency component and imposing the same upon the radio frequency current, for modulation. Any suitable modulator may be employed, such as the buzzer Z provided with an operating battery C, a milliameter $A^2$ and a suitable adjustable resistance $R^5$. The buzzer may be of any suitable design, such as a common form well known in the art provided with primary and secondary windings, the latter in series with the negative terminal of battery B. Modulation of the radio frequency current is therefore accomplished by the voltage in the secondary coil of the buzzer, which is adjusted by resistance $R^5$ to give any proper or desired value of modulation.

The production of a signal of absolutely determined value also involves or requires proper and satisfactory shielding of the apparatus. To prevent any possible effect on any of the apparatus of stray radio frequency oscillations the entire apparatus is enclosed in a suitable grounded metal shield $S^1$, within which the tuning inductance $L^1$ is also enclosed in a separate individual grounded shield $S^2$. Separate shielding of the antenna resistance is also exceedingly important for the reason that experience shows that a resistance of this character when influenced by radio frequency effects from an external source does not exactly follow Ohms law. The antenna resistance is therefore enclosed within its own individual shield $S^3$ and is non-inductively wound, with the result that experience and accurate measurement show that the radio frequency voltage drop across the antenna resistance closely follows or obeys Ohms law. For the same purpose, to prevent modifying effect of stray external radio frequency currents, at least the antenna lead from the antenna resistance to the radio receiver, and also the ground lead or connection from the antenna resistance, are also enclosed in grounded metal shields $S^4$, $S^5$. As a result, when the apparatus is in operation no other signal reaches the radio receiver than that delivered through the leads from the antenna resistance.

With this apparatus the radio receiver M is supplied with any suitable means for measuring its output. The receiver is preferably tested in exactly the same manner as when it is normally operated for reception, for which purpose an adapter may be supplied to be inserted in the socket of the last tube, the tube being then inserted into the adapter, which is provided with leads for a suitable current meter. Such an arrangement is suitable when the phones or loud speaker are so connected as to make it difficult to plug into the output circuit. In any case, the output is measured by inserting into the output circuit of the receiver, in series with the phones or loud speaker N, a suitable meter O, which may be a voltmeter, milliameter, or the like, so long as it measures only the audio frequency component and not the direct current in the plate or output circuit, because measurement of either audio current or audio voltage is satisfactory, as they vary in step with each other but inversely, and, after all, the measurements with this apparatus are comparative rather than absolute in the sense that the apparatus is used either for comparing a series of like receivers or for comparing receivers with known or standard values which they should produce.

In use of the apparatus, it is connected to a radio receiver in the manner shown in Fig. 1. Either all or half of the antenna resistance may be employed.

The resistance $R^5$ in the modulator is adjusted to any desired value, such as to give about 30% modulation. With its volume control, if any, adjusted to maximum, the receiver is then tuned to a definite frequency by manipulation of its own tuning condenser or other devices, and the testing apparatus is tuned to resonance therewith by adjustment of the variable condenser $C^3$. Resistance $R^3$ is next adjusted to produce any desired value of current in the antenna resistance and consequently to produce any desired value of voltage supplied to the radio receiver. This value is usually chosen somewhere between ten and one hundred microvolts, which is on the order of the value of an ordinary incoming broadcast radio signal. The output of the receiver is measured on the output meter O.

The radio receiver and testing set are then tuned in resonance at another frequency, the resistance R³ being again adjusted to give the same value of voltage input to the receiver and the output is again measured. Through all determinations the modulating effect is maintained constant by proper adjustment of the resistance in the modulating circuit.

By such operations a receiver may be tested with various power voltage inputs and throughout its range of frequencies.

Figs. 2 and 3 illustrate graphs of actual receiver tests made with this apparatus. In Fig. 2 the receiver was tested with voltage inputs of ten, twenty or forty microvolts, the three traces representing the over-all amplification value over the entire broadcasting range with such voltage inputs. Fig. 3 shows another receiver tested with voltage inputs of thirty and forty microvolts respectively.

Where a given receiver is operated in practice with an antenna, the antenna circuit during the test should include a suitable dummy or phantom antenna Q corresponding with that usually employed with the receiver. Such dummy or phantom antenna may be of any suitable form containing resistance, inductance and capacity corresponding in value with those usually employed in actual receiving of broadcast radio signals.

What I claim is:

1. Apparatus for testing radio receivers, comprising an oscillator having its plate circuit provided with parallel paths arranged to filter and separate the radio frequency from the direct current, modulating means applied to the plate circuit, the radio frequency output path including an antenna resistance and in shunt therewith a resistance adjustable by minute steps, means for applying voltage from said antenna resistance to the radio receiver, and means for measuring the voltage across said antenna resistance.

2. Apparatus for testing the over-all amplification of a radio set, comprising an ossillator, means for tuning the same, the plate circuit of said oscillator being provided with two paths, one for the radio frequency oscillations and the other for the direct current, modulating means in the direct current path, and means for applying radio frequency oscillations from the radio frequency path to a radio receiver comprising an antenna resistance in the radio frequency path, a variable resistance in shunt therewith, and means for measuring the radio frequency current in said antenna resistance.

3. Apparatus for testing radio receivers, comprising an oscillator, means for tuning the same, the plate circuit of said oscillator being provided with two paths, means for causing the radio frequency oscillations to follow one path and the direct current to follow the other path, said radio frequency path including an antenna resistance, means for measuring the current flow therein, and a variable resistance in a circuit across said antenna resistance for varying the current flow therein.

In testimony whereof I hereby affix my signature.

ROBERT D. HICKOK.